United States Patent
Thapani et al.

(10) Patent No.: US 10,586,455 B2
(45) Date of Patent: *Mar. 10, 2020

(54) SYSTEMS AND METHODS FOR VEHICLE LANE CHANGE DETECTION

(71) Applicant: VEONEER US, INC., Southfield, MI (US)

(72) Inventors: Ramesh Veerabhadra Pantulu Baladandayu Thapani, West Bloomfield, MI (US); Shan Cong, Superior Township, MI (US)

(73) Assignee: Veoneer US, Inc., Southfield, MI (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/788,682

(22) Filed: Oct. 19, 2017

(65) Prior Publication Data

US 2019/0122557 A1    Apr. 25, 2019

(51) Int. Cl.
| | | |
|---|---|---|
| *G08G 1/16* | (2006.01) |
| *B60W 40/10* | (2012.01) |
| *G01S 13/93* | (2020.01) |
| *G01S 13/931* | (2020.01) |

(52) U.S. Cl.
CPC .......... *G08G 1/167* (2013.01); *B60W 40/10* (2013.01); *G01S 13/931* (2013.01); *G01S 2013/9367* (2013.01)

(58) Field of Classification Search
CPC ...... G08G 1/167; B60W 40/10; G01S 13/931; G01S 2013/9367
See application file for complete search history.

(56) References Cited

U.S. PATENT DOCUMENTS

| | | | | |
|---|---|---|---|---|
| 6,169,940 B1 * | 1/2001 | Jitsukata | ............... | B62D 1/28 340/903 |
| 6,215,392 B1 * | 4/2001 | Okada | .................. | B62D 1/28 340/436 |
| 6,343,247 B2 * | 1/2002 | Jitsukata | ............ | G01C 21/26 180/168 |
| 6,470,272 B2 * | 10/2002 | Cong | ................ | G01S 13/723 701/301 |
| 6,795,765 B2 * | 9/2004 | Miyahara | ......... | B60K 31/0008 180/170 |
| 8,165,776 B2 | 4/2012 | Sugawara et al. | | |
| 8,340,883 B2 * | 12/2012 | Arbitmann | ........ | B60W 10/06 235/439 |
| 8,874,342 B2 | 10/2014 | Noda | | |
| 9,180,881 B2 | 11/2015 | Lim et al. | | |

(Continued)

OTHER PUBLICATIONS

Dec. 4, 2018, PCT/US18/56126 International Search Report (2 pgs).
Dec. 4, 2018 PCT/US18/56126 Written Opinion (6 pgs).

*Primary Examiner* — Nicholas Kiswanto
(74) *Attorney, Agent, or Firm* — Matthew D. Thayne; Thayne and Davis LLC

(57) ABSTRACT

Methods and systems for detecting lane changes using vehicle path data. In some implementations, one or more environmental sensors, such as RADAR modules, may be used to generate a first data set associated with a trajectory of a host vehicle. The first data set may be representative of a curve on a graph. Points of inflection may be sought in the curve. An identification of a point of inflection in the curve may then be used to confirm a lane change of the host vehicle.

20 Claims, 3 Drawing Sheets

(56) References Cited

U.S. PATENT DOCUMENTS

| | | | |
|---|---|---|---|
| 9,423,261 B2* | 8/2016 | Dorum | G01C 21/34 |
| 9,555,781 B2* | 1/2017 | Breuer | B60T 7/22 |
| 9,592,829 B2 | 3/2017 | Roelke et al. | |
| 2005/0225477 A1* | 10/2005 | Cong | B60K 31/0008 |
| | | | 342/70 |
| 2010/0191421 A1 | 7/2010 | Nilsson | |
| 2015/0070207 A1 | 3/2015 | Millar et al. | |
| 2015/0321699 A1 | 11/2015 | Rebhan et al. | |
| 2019/0122556 A1* | 4/2019 | Thapani | G08G 1/167 |

* cited by examiner

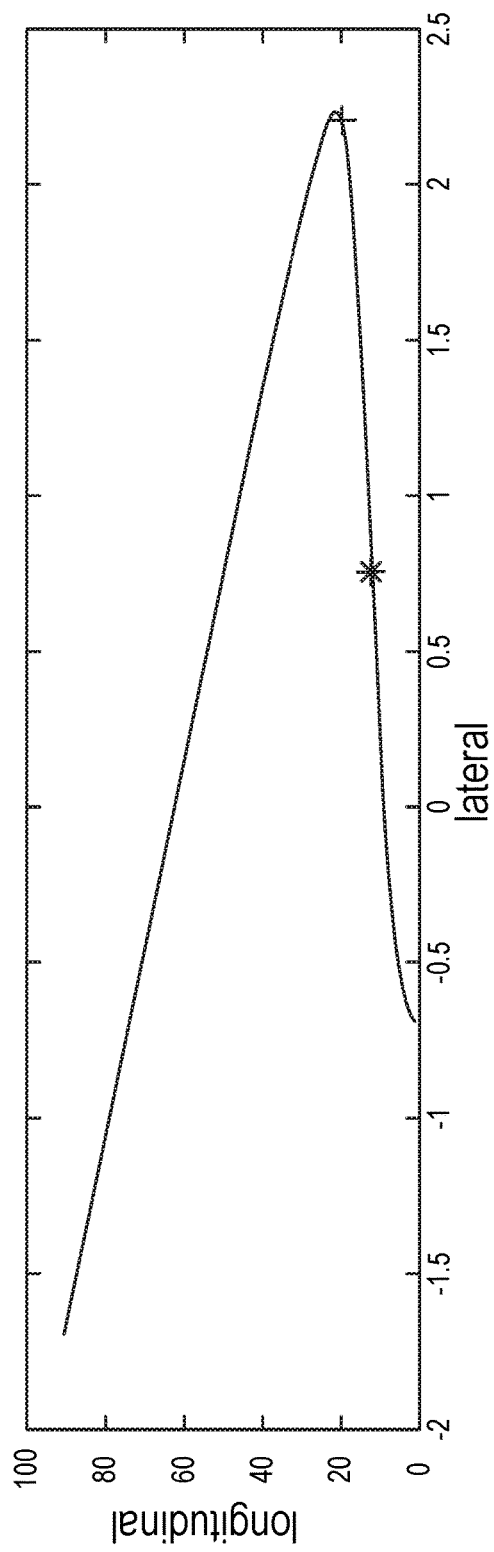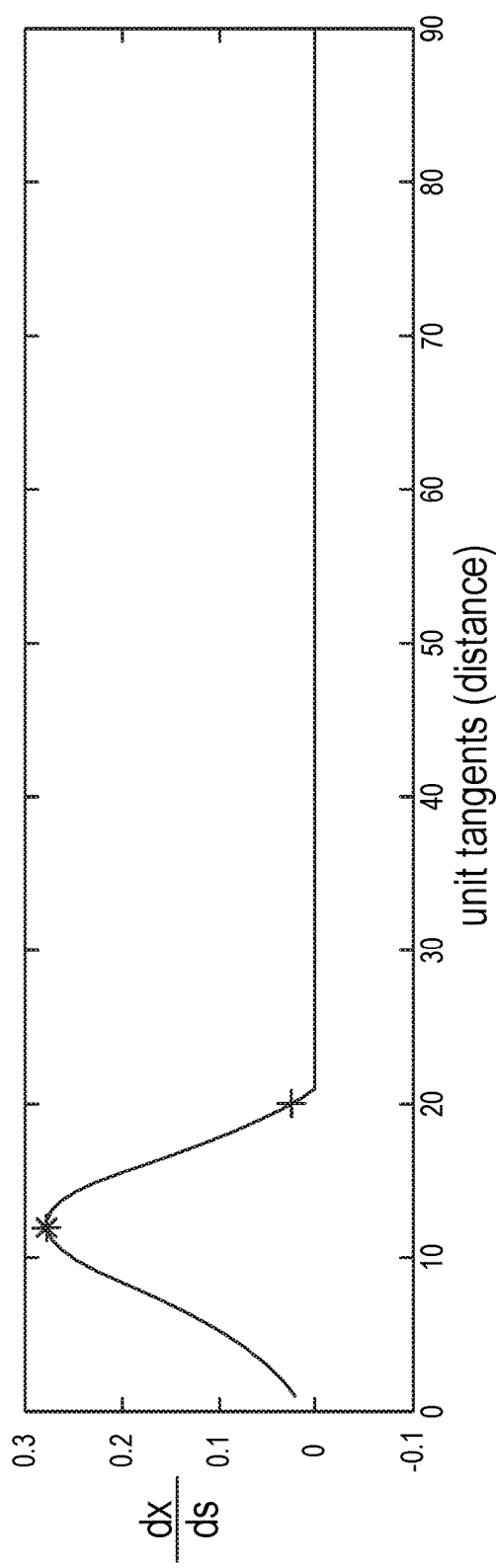
FIG. 1
FIG. 2

SYSTEMS AND METHODS FOR VEHICLE LANE CHANGE DETECTION

SUMMARY

Lane change assist systems typically identify a region or zone of interest within which the remote detection components, such as RADAR modules, of such systems, will search for targets for alerting drivers and/or assisting drivers in safely changing lanes. Predicting, detecting, and/or confirming lane changes may therefore be of particular importance to lane change assist systems and/or other driver assist features of modern vehicles. This is because, in some cases, it may be desirable to reset/recalculate/update the zone of interest upon confirming that the host vehicle has made a lane change.

The present inventors have therefore determined that it would be desirable to provide systems and methods that improve upon lane change prediction, detection, and/or confirmation to improve the accuracy of the lane change assist systems and/or other relevant systems of a vehicle. Thus, in some embodiments, the inventive concepts disclosed herein may be used to detect host vehicle lane changes by processing and/or analyzing host vehicle path data, such as seeking to identify patterns in the host vehicle path data, which may be derivable from such data.

In a more particular example of a method for vehicle lane change detection, the method may comprise using one or more environmental sensors, such as one or more RADAR sensors, LIDAR sensors, cameras, or the like, to generate a first data set associated with a trajectory of a vehicle, which may be representative of and/or used/usable to establish the geometry of the host vehicle's path, which may include a lane change maneuver of the host vehicle. A point of inflection may be identified in the curve, such as by processing the first data set (which need not comprise actually generating a visible curve). The identification of a point of inflection or other geometric pattern of the curve may be used to confirm a lane change of the vehicle.

Some implementations may further comprise deriving a second data set from the first data set. In some such implementations, the step of using the identification of the point of inflection in the graph to confirm a lane change of the vehicle may comprise identifying convexity and/or a point of maxima or minima in a graph derivable from the second data set.

In some implementations, the second data set may be representative of unit tangents along the curve.

Some implementations may further comprise determining a lane change onset location using the first data set. In some such implementations, the step of determining a lane change onset location using the first data set may comprise deriving a second data set from the first data set, wherein the second data set is representative of unit tangents along the curve; and determining where a graph derivable from the second data set is non-zero.

Some implementations may further comprise, prior to the step of using the identification of the point of inflection in the curve to confirm a lane change of the vehicle, determining whether there is a possible lane departure of the vehicle. In some such implementations, the step of determining whether there is a possible lane departure of the vehicle may comprise confirming lateral displacement of the vehicle from a current lane beyond a distance threshold.

In another example of a method for vehicle lane change detection according to other implementations, the method may comprise generating a first data set representative of a historical map of a vehicle trajectory and determining whether there is a possible lane departure of the vehicle. Upon confirming a possible lane departure of the vehicle, a determination may be made as to whether the possible lane departure is a lane change by seeking to identify an inflection point in a curve derivable from the first data set. Upon identifying an inflection point in the curve, a parameter of a lane change assist system of the vehicle may be adjusted.

In some implementations, the step of determining whether there is a possible lane departure may comprise confirming lateral displacement of the vehicle from a current lane beyond a distance threshold. In some such implementations, the distance threshold may comprise a distance of between about 50% and about 70% of the lane width in the current path, which lane width may be, for example, detected, input as a known variable (such as a standard lane width), or derived from the current geography of the host vehicle.

In some implementations, the step of adjusting a parameter of a lane change assist system of the vehicle may comprise resetting a zone of interest of the lane change assist system.

Some implementations may further comprise determining a lane change onset location using the first data set. In some such implementations, the lane change onset location may be used to adjust a parameter of a lane change assist system of the vehicle.

In some implementations, the step of determining a lane change onset location using the first data set may comprise using the first data set to determine a location at which a lateral velocity of the vehicle matches a current value of the lateral velocity in the first data set.

Some implementations may further comprise, following confirmation that the possible lane change is a lane change, determining which portion of the vehicle trajectory from first data set is within a current lane of a vehicle lane change assist system of the vehicle.

In an example of a system for vehicle lane change detection, the system may comprise one or more environmental sensors configured to generate vehicle environmental data, such as RADAR sensors, LIDAR sensors, cameras, and the like. The system may further comprise a vehicle trajectory module configured to process the vehicle environmental data and to generate vehicle trajectory data from which a map of a history of a host vehicle trajectory may be derived. The vehicle trajectory module may be further configured to identify a lane change by searching for points of inflection in a curve derivable from the vehicle trajectory data.

In some embodiments, the vehicle trajectory module may be configured to identify points of inflection in the curve by taking a derivative of a function derivable from the vehicle trajectory data and identifying locations at which the function is equal to zero.

In some embodiments, the vehicle trajectory module may be configured to identify points of inflection in the curve by identifying convexity in a graph derivable from the vehicle trajectory data. In some such embodiments, the graph used to identify convexity may be a graph derivable from the first graph of the vehicle trajectory.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 1 illustrates a lane change as plotted on a graph of lateral vs. longitudinal displacement;

FIG. 2 illustrates a lane change as plotted on a graph of unit tangents along the curve of FIG. 1 against a derivative of the lateral distance with respect to distance;

DETAILED DESCRIPTION

Figure 3:
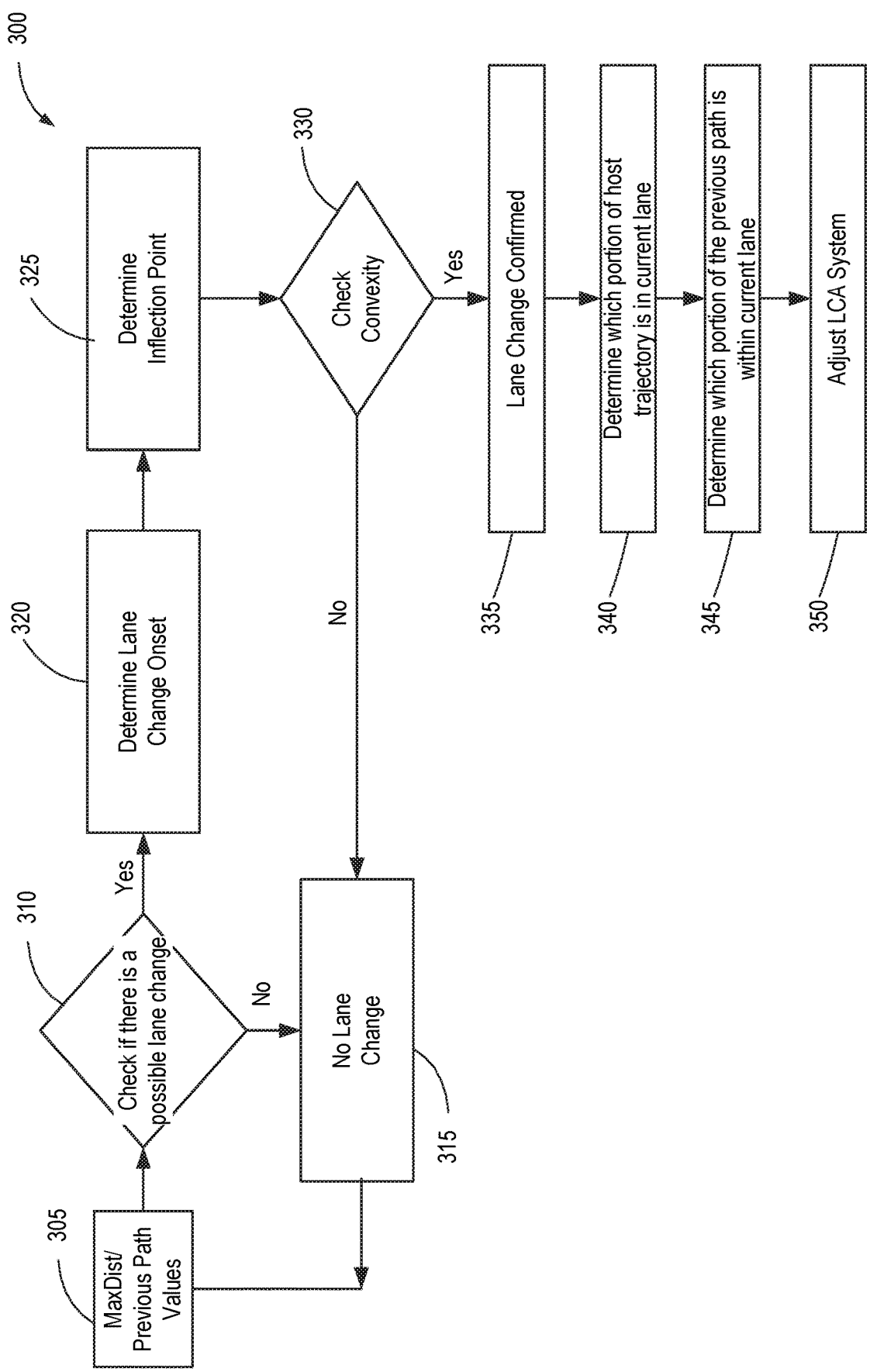
FIG. 3 is a flow chart illustrating a method for detecting a lane change in accordance with some implementations of the invention.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to detecting of host vehicle lane changes. In some embodiments and implementations, this may be done using host path information, which may comprise data representative of a map of the host vehicle path. This map may be transformed to current sensor coordinates and may be generated by environmental information generated by various sensors, such as, for example, RADAR. In preferred embodiments and implementations, a host vehicle lane change may be predicted and/or confirmed by seeking to identify inflection points in the host path, which may be obtained, for example, by generating data representative of derivatives of the host path data, such as data representative of a second derivative of a host vehicle path curve.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 illustrates a lane change as plotted on a graph of lateral vs. longitudinal displacement. The graph illustrated in FIG. 1 may be created using a system and/or module configured to obtain environmental information and generate data representative of (although not necessarily leading to the generation of) a map of the path of a host vehicle. For example, environmental sensors/detectors, such as RADAR, LIDAR, cameras, and the like may be used to generate the initial data, which data may be processed to generate the path map and/or data. The same module/system, or a different module/system, may be used to process the initial data to generate data representative of and/or which may be used for, creating the graphs of FIGS. 1 and 2, for example.

FIG. 2 illustrates a lane change as plotted on a graph of unit tangents along the curve of FIG. 1 against a derivative of the lateral distance with respect to distance. The graph of FIG. 2 may be generated by processing the data used to generate the graph of FIG. 1. More particularly, if x is used to represent the lateral distance of the host vehicle, y is used to represent the longitudinal distance of the host vehicle, and s the distance along a path, a heading change can be represented as follows:

$$\mathrm{atan}\frac{\Delta y}{\Delta x}$$

Similarly, a unit tangent along the curve of FIG. 1 may be represented as follows:

$$T = a\mathrm{tan}\frac{\Delta x}{\Delta s} \sim \frac{\Delta x}{\Delta y} \sim (1)$$

This is because $s=\sqrt{x^2+y^2}\approx y$, $y \gg x$, provided that the host trajectory is maintained at constant waypoints along the host vehicle's path.

Although certain implementations and embodiments of the inventions disclosed herein may utilize the heading change formula referenced above without the use of unit tangents in order to facilitate detecting a lane change, the present inventors have discovered that using unit tangents for detecting lane changes may be more numerically stable. Moreover, although a unit tangent can be in interpreted as a measure of lateral velocity along the curve of FIG. 1, other methods may be used for determining lateral velocity and/or for processing lateral velocity measurements and/or proxies to detect lane changes.

With the understanding provided herein that use of unit tangents may be more numerically stable, the graph of FIG. 2 represents this preferred use of unit tangents on the x axis and further represents a derivative of the data used to generate the graph of FIG. 1, namely, dx/ds, on the y axis. Two equivalent points on the graphs of FIGS. 1 and 2 are depicted in these graphs. In particular, the asterisk (*) in FIG. 2 is positioned at an inflection point in the graph of FIG. 1, and further represents a transition point between lanes. More particularly, and as discussed in greater detail below, identification of this inflection point, which represents a point of maxima on the graph of FIG. 2, may be used to predict and/or confirm a lane change, and may therefore be incorporated into a lane change assist (LCA) system or another vehicle system in which the detection of a lane change may be needed.

Other information from data sets used to generate the graphs depicted in FIGS. 1 and 2 may be used in the process of detecting lane changes as well, or alternatively. For example, the location at which the graph depicted in FIG. 2 departs from zero, which is represented by the plus "+" sign in this figure, may be used to detect the onset of the lane change. Thus, data representative of this feature may be used to infer and/or predict a possible lane change. Such data may also be used after confirming a lane change to calculate the point at which the lane change began. This location is also depicted in the graph of FIG. 1.

Although not specifically identified in FIG. 2, the location at which the lane change was completed may also be identified and/or tracked for use in an LCA system if desired. In FIG. 2, this location may correspond, at least generally, with the point at which the curve in FIG. 2 returns to or near zero. By identifying the onset and/or completion points of a lane change, and by correlating this data with path data, the duration of the lane change may be calculated and/or a suitable location in the host vehicle for adjusting an operational parameter of the LCA system or another similar system may be identified. For example, following detection of a lane change, the lane change assist system may recalculate a distance and/or time travelled in the new lane upon detecting and/or confirming that a lane change has taken place and adjust the path/mapping module/system/information accordingly.

Obviously, the determinations/calculations referenced herein may be made with the requisite data without actually generating a graph. For example, a point of inflection of the graph of FIG. 1 may be identified using the data representative of the graph of FIG. 1 by searching for solutions to the equation ∂T(x)=0. Because points of inflections may identify locations at which the lateral velocity of the host vehicle changes direction, this may be used as a proxy during a process for identifying a lane change. In some embodiments and implementations, this may be used to confirm the lane change and other data may be used to trigger processing of data to provide such confirmation. Alternatively, this may be used as an initial trigger to predict a lane change and other data may be used to confirm the lane change. As yet another alternative, the identification of points of inflection may be used alone to identify lane changes without any additional data points and/or processing.

Similarly, other data may be derived from the data used to generate the graphs of FIGS. 1 and 2. For example, the onset points, lane change completion points, and/or lane change durations previously mentioned may be identified by determining where a lateral velocity matches a previous value (prior to a lane change initiation/prediction) and/or where a departure or arrival from zero on the graph of FIG. 2 is identified.

FIG. 3 is a flow chart illustrating a method 300 for detecting a lane change in accordance with some implementations of the invention. As shown in this figure, the method may begin at 305 by introduction/use of previous data, such as data used to generate a previous path of the host vehicle, a threshold distance associated with a current zone of interest within which the LCA or other system is attempting to detect targets, and the like. For example, the zone of interest may have a maximum distance behind the host vehicle within which the system will search for targets. Thus, in some embodiments, this maximum distance may be generated and/or transmitted at 305. In addition, the detection of a lane change, as discussed in greater detail below, may result in updating the zone of interest, which may result in recalculation of this threshold distance.

Method 300 may then proceed to step 310, at which an initial determination/trigger may be applied to determine a possible lane change. For example, in some implementations and embodiments, an LCA system may simply seek to identify a threshold lateral displacement of the host vehicle, such as confirming lateral displacement of the vehicle from a current lane beyond a distance threshold. In some embodiments and implementations, the distance threshold comprises a distance of between about 50% and about 70% of the lane width in the current path, which lane width may be, for example, detected, input as a known variable (such as a standard lane width), or derived from the current geography of the host vehicle.

Upon confirming that the distance threshold has been met or, in alternative embodiments and implementations, otherwise obtaining information suggestive or indicative of a possible lane change, method 300 may then proceed to step 320. If not, method 300 may proceed to step 315.

At step 320, the location of the lane change onset may be identified. For example, in some embodiments and implementations, the location at which the initial trigger—e.g., surpassing the lateral distance threshold, for example—has been triggered, may be identified and/or stored for possible later use. An inflection point may be sought and/or determined at step 325. As previously discussed, this may be done by analyzing path data, taking derivatives of equations from such data, and/or seeking to identify inflection points in curves representative of and/or derivable from such data.

In some implementations, an additional step at 330 may be performed to further confirm the suspected lane change. More particularly, the convexity of a curve derivable from the path data, such as the curve depicted in FIG. 2 (which may comprise a curve representative of a second derivative of a function used to generate a path/location curve, such as the curve of FIG. 1), may be checked. Upon identification/confirmation of such convexity, the lane change may be confirmed at 335. In alternative embodiments and implementations, however, step 330 may instead comprise checking for inflection points, in which case the identification of an inflection point in a curve representative of a vehicle path and/or generated from path data may be used alone to confirm a lane change. In the event that convexity is not identified (and/or no points of inflection are identified), method 300 may revert to step 315 to confirm the lack of a lane change and restart the process.

Following confirmation of a lane change, method 300 may then determine at 340 which portion of the host trajectory is in the current lane to demark the lane change, which may be useful, for example, in order to adjust a current zone of interest associated with an LCA system. In some embodiments and implementations, data from which the curves previously discussed, such as the curves of FIGS. 1 and 2, may be derived may also be used to delineate the location of the lane change, which may be used to determine which portion of the host trajectory falls within the current lane at 345 (and which falls within the previous lane before the lane change). In some embodiments and implementations, a determination may also be made regarding which portion of the previous host path falls within the current lane, which, once again, may comprise use of the curves previously mentioned and/or data from which the curves may be generated.

The LCA system may then be adjusted at 350 in accordance with the updated data. For example, in some embodiments and implementations, a parameter of the LCA system may be updated to account for the host vehicle having moved to a new lane. This may include, for example, updated distance calculations associated with distance thresholds for searching for targets. As another example, a trajectory module may be updated in order to take into account the new lane and the new adjacent lanes.

Figure 4:
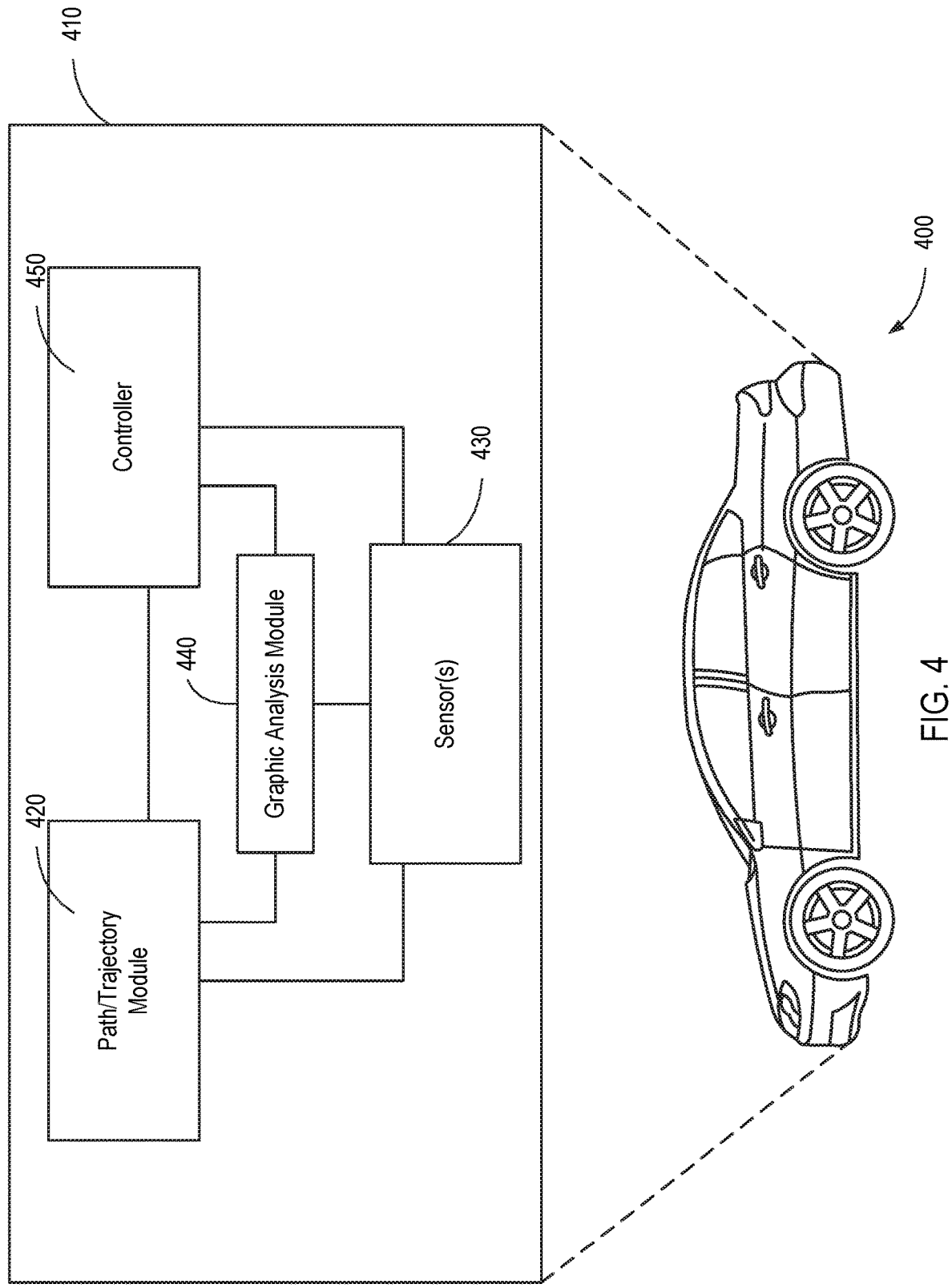
FIG. 4 is a schematic diagram of a vehicle comprising a vehicle lane change assist system according to some embodiments.

FIG. 4 is a schematic diagram of a vehicle 400 comprising a vehicle lane change assist system 410 according to some embodiments. LCA system 410 may comprise a path/trajectory module 420, which may be used to generate a trajectory and/or path of the host vehicle. Data for obtaining this path may be generated from one or more sensors 430, which may comprise, for example, environmental sensors, such as from RADAR, LIDAR, cameras, etc., and/or various other internal sensors, such as steering wheel sensors, yaw rate sensors, and the like.

A graphic analysis module 440 may also be provided, which may be used, in combination with controller 450, to process data from sensor(s) 430. As used herein, the term controller refers to a hardware device that includes a processor and preferably also includes a memory element. The memory may be configured to store one or more of the modules referred to herein and the controller 450 and/or processor may be configured to execute the modules to perform one or more processes described herein. Graphic analysis module 440 may be configured to obtain path data from path/trajectory module 420 and process this path data, as described above, to generate one or more additional data sets, which additional data sets may be representative of and/or used to generate graphs for deriving information usable for determining a vehicle lane change, as described above.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for vehicle lane change detection, the method comprising the steps of:
   using one or more environmental sensors to generate a first data set associated with a trajectory of a host vehicle, wherein the first data set is representative of a curve on a graph;
   identifying a point of inflection in the curve; and
   using the identification of the point of inflection in the curve to confirm a lane change of the host vehicle.

2. The method of claim 1, further comprising deriving a second data set from the first data set, and wherein the step of using the identification of the point of inflection in the graph to confirm a lane change of the host vehicle comprises identifying convexity in a graph derivable from the second data set.

3. The method of claim 2, wherein the second data set is representative of unit tangents along the curve.

4. The method of claim 3, further comprising determining a lane change onset location using the first data set.

5. The method of claim 4, wherein the step of determining a lane change onset location using the first data set comprises:
   deriving a second data set from the first data set, wherein the second data set is representative of unit tangents along the curve; and
   determining where a graph derivable from the second data set is non-zero.

6. The method of claim 1, wherein the one or more environmental sensors comprises at least one of a RADAR sensor, a LIDAR sensor, and a camera.

7. The method of claim 1, wherein the step of identifying a point of inflection in the curve is performed without generating a visual display of the curve.

8. The method of claim 1, further comprising, prior to the step of using the identification of the point of inflection in the curve to confirm a lane change of the host vehicle, determining whether there is a possible lane departure of the host vehicle.

9. The method of claim 8, wherein the step of determining whether there is a possible lane departure of the host vehicle comprises confirming lateral displacement of the host vehicle from a current lane beyond a distance threshold.

10. A method for vehicle lane change detection, the method comprising the steps of:
generating a first data set representative of a historical map of a host vehicle trajectory;
determining whether there is a possible lane departure of the host vehicle;
upon confirming a possible lane departure of the host vehicle, determining whether the possible lane departure is a lane change by seeking to identify an inflection point in a curve derivable from the first data set; and
upon identifying an inflection point in the curve, adjusting a parameter of a lane change assist system of the host vehicle.

11. The method of claim 10, wherein the step of determining whether there is a possible lane departure comprises confirming lateral displacement of the host vehicle from a current lane beyond a distance threshold.

12. The method of claim 11, wherein the distance threshold comprises a distance of between about 50% and about 70% of a width of the current lane.

13. The method of claim 10, wherein the step of adjusting a parameter of a lane change assist system of the host vehicle comprises resetting a zone of interest of the lane change assist system.

14. The method of claim 10, further comprising determining a lane change onset location using the first data set.

15. The method of claim 14, further comprising using the lane change onset location to adjust a parameter of a lane change assist system of the host vehicle.

16. The method of claim 14, wherein the step of determining a lane change onset location using the first data set comprises using the first data set to determine a location at which a lateral velocity of the host vehicle matches a current value of the lateral velocity in the first data set.

17. The method of claim 10, further comprising, following confirmation that the possible lane change is a lane change, determining which portion of the host vehicle trajectory from first data set is within a current lane of a vehicle lane change assist system of the host vehicle.

18. A system for vehicle lane change detection within a host vehicle, comprising:
one or more environmental sensors configured to generate vehicle environmental data for a host vehicle; and
a vehicle trajectory module configured to process the vehicle environmental data and to generate vehicle trajectory data from which a map of a history of a host vehicle trajectory may be derived, and wherein the vehicle trajectory module is further configured to identify a lane change of the host vehicle by searching for points of inflection in a curve derivable from the vehicle trajectory data.

19. The system of claim 18, wherein the vehicle trajectory module is configured to identify points of inflection in the curve by:
taking a derivative of a function derivable from the vehicle trajectory data; and
identifying locations at which the function is equal to zero.

20. The system of claim 18, wherein the vehicle trajectory module is configured to identify points of inflection in the curve by identifying convexity in a graph derivable from the vehicle trajectory data.

* * * * *